(12) United States Patent
Bieber

(10) Patent No.: US 9,617,113 B2
(45) Date of Patent: Apr. 11, 2017

(54) CLAMPING DEVICE FOR FILM ROLLS

(71) Applicant: LEONHARD KURZ Stiftung & Co. KG, Furth (DE)

(72) Inventor: Reinhard Bieber, Rohr (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 98 days.

(21) Appl. No.: 14/437,576

(22) PCT Filed: Oct. 28, 2013

(86) PCT No.: PCT/EP2013/072536
§ 371 (c)(1),
(2) Date: Apr. 22, 2015

(87) PCT Pub. No.: WO2014/067910
PCT Pub. Date: May 8, 2014

(65) Prior Publication Data
US 2015/0291387 A1    Oct. 15, 2015

(30) Foreign Application Priority Data
Oct. 31, 2012 (DE) .................. 10 2012 110 434

(51) Int. Cl.
   *B65H 75/24* (2006.01)
   *F16B 2/04* (2006.01)
   *F16B 2/18* (2006.01)

(52) U.S. Cl.
   CPC ............. *B65H 75/242* (2013.01); *F16B 2/04* (2013.01); *F16B 2/185* (2013.01);
   (Continued)

(58) Field of Classification Search
   CPC .............................. B65H 75/242; F16B 2/185
   See application file for complete search history.

(56) References Cited

U.S. PATENT DOCUMENTS 2,904,278 A    9/1959 Riemenschneider
2,922,592 A    1/1960 Kaltenbach
(Continued)

FOREIGN PATENT DOCUMENTS

| DE | 853905  | 10/1952 |
|----|---------|---------|
| DE | 2344706 | 3/1975  |
| GB | 2272428 | 5/1994  |

*Primary Examiner* — Sang Kim
(74) *Attorney, Agent, or Firm* — Hoffmann & Baron, LLP

(57) ABSTRACT

A clamping device (1) for receiving and clamping a film roll (2) is described, comprising a winding core (21) and a film reel (22) arranged on the winding core (21), wherein the clamping device (1) can be moved from an open position, in which the film roll (2) can be inserted into the clamping device (1) or removed from the clamping device (1), into a clamping position, in which the film roll (2) is clamped in the clamping device (1). The clamping device (1) comprises a grooved shaft (11) with receiving grooves (11n) arranged in the longitudinal direction offset at the same angular distance, a screw gear formed from a ring nut (12) and a lock nut (14), and clamping levers (16) arranged radially offset at the same angular distance. An output member of the screw gear interacts with the clamping levers (16) such that, when the clamping device (1) is in the clamping position, the clamping levers (16) bear on the base of the grooves (11n) of the grooved shaft (11) and on the inner wall of the winding core (21), forming a clamping force.

12 Claims, 4 Drawing Sheets

(52) U.S. Cl.
CPC ............. *B65H 2301/41308* (2013.01); *B65H 2403/52* (2013.01); *B65H 2405/462* (2013.01)

(56) References Cited

U.S. PATENT DOCUMENTS

| | | | | |
|---|---|---|---|---|
| 4,615,494 | A | * | 10/1986 | Focke .................... B65H 16/04 242/597.3 |
| 4,763,850 | A | * | 8/1988 | Hausner ............... B65H 75/248 242/574.4 |
| 4,991,785 | A | * | 2/1991 | Kuo ..................... B65H 75/242 242/575.3 |
| 2009/0194631 | A1 | * | 8/2009 | Genta ................... B41J 11/001 242/576 |

* cited by examiner

CLAMPING DEVICE FOR FILM ROLLS

This application claims priority based on an International Application filed under the Patent Cooperation Treaty, PCT/EP2013/072536, filed on Oct. 28, 2013, and German Application No. DE 102012110434.4, filed on Oct. 31, 2012.

BACKGROUND OF THE INVENTION

The invention relates to a clamping device for receiving and clamping a film roll.

With hot stamping machines, cold stamping machines, devices for advancing film for the in-mold process or for film winding during manufacture an object is to change film rolls quickly and with as little effort as possible. The film rolls comprise a winding core and a film web wound up on the winding core.

It is known to fasten the film rolls to receiving shafts by means of steel claws, wherein the steel claws are manually pushed into the cardboard or plastic winding core of the film roll in order to fix the winding core onto the receiving shaft.

SUMMARY OF THE INVENTION

The object of the invention is to develop a clamping device which makes clamping possible with reduced expenditure in terms of time and operation.

This object is achieved according to the invention with the subject-matter of claim 1. A clamping device for receiving and clamping a film roll is proposed, comprising a winding core and a film reel arranged on the winding core, wherein the clamping device can be moved from an open position, in which the film roll can be inserted into the clamping device or removed from the clamping device, into a clamping position, in which the film roll is clamped in the clamping device, wherein it is provided that the clamping device comprises a grooved shaft with receiving grooves arranged in the longitudinal direction offset at the same angular distance, a screw gear formed from a ring nut and a lock nut, and clamping levers arranged radially offset at the same angular distance, wherein an output member of the screw gear interacts with the clamping levers such that, when the clamping device is in the clamping position, the clamping levers bear on the base of the grooves of the grooved shaft and on the inner wall of the winding core, forming a clamping force.

The clamping device according to the invention has the advantage that it can be operated without tools and, because of the arrangement of the clamping levers offset at the same angular distance, centers the film roll on the clamping device.

It can be provided that the lock nut is the output member of the screw gear.

It can further be provided that the grooved shaft has three receiving grooves arranged in the longitudinal direction offset by 120°, in which three clamping levers arranged radially offset by 120° engage.

It can further be provided that the ring nut has three groove-shaped bearing recesses arranged radially offset by 120°, which form pivot bearings for the clamping levers, and that, on its outer circumference, the lock nut has three groove-shaped positioning recesses offset by 120°, in which the clamping levers engage.

Such an arrangement of three receiving grooves and correspondingly three clamping levers engaging therein, distributed equally on the circumference (3×120°=360°), advantageously has a self-centering effect on the clamping device, with the result that tilting or other incorrect positions which impede a firm clamping can be prevented.

The clamping levers can be formed as T-shaped angle levers with a first and a second lever arm, wherein the second lever arm protrudes from the first lever arm and divides the first lever arm into a longer and a shorter segment.

It can be provided that the end section of the longer segment of the first lever arm of the clamping lever is formed as a projecting pressure piece which, when the clamping device is in the clamping position, bears on the inner wall of the winding core, that the shorter segment of the first lever arm of the clamping lever has a curved end section which, when the clamping device is in the clamping position, bears on the base of the groove of the grooved shaft, that a curved-projecting middle section of the second lever arm of the clamping lever engages in the groove-shaped bearing recess of the ring nut, and that the end section of the second lever arm of the clamping lever engages in the positioning recess of the lock nut. The clamping lever can advantageously be formed as a stamped part, for example made from sheet steel.

The threads of the ring nut and of the lock nut can be formed as self-locking threads. The self-locking screw gear thus formed has the advantage that it cannot be brought into an open position by axial forces.

It can further be provided that the clamping device has a front locating disk and a rear locating disk facing the film roll, wherein the front locating disk is connected to the lock nut rotationally rigid and the rear locating disk is connected to the ring nut rotationally rigid. With the aid of these locating disks with preferably a larger diameter than the lock nut and the ring nut, the clamping device can be operated manually with little exertion of force. Because the diameter of the locating disks in each case is larger, for example two or three times larger, compared with the lock nut and the ring nut, the circumference of the locating disks can be grasped manually and more force can thereby be exerted on the lock nut inside and the ring nut.

The front locating disk can advantageously have a smaller diameter than the rear locating disk. During manual operation, it is thereby easier to operate both locating disks at the same time, even if they are arranged close to each other. In addition, it is easier to distinguish visually which locating disk belongs to the lock nut and which locating disk belongs to the ring nut. Alternatively or in addition, this visual distinction can be generated by a different colored marking of the locating disks.

It has proven worthwhile for the front locating disk to have markings which indicate the direction of rotation of the front locating disk to set the clamping position and the open position of the clamping device. These markings can, for example, be symbols which also support the visual distinctness during manual operation. By a clear visual assignment of the two locating disks, a quick and low-error operation of the locating disks is possible.

It can be provided that an extension set for changing, in particular enlarging, the receiving diameter of the winding cores can be inserted into the clamping device.

It can further be provided that the extension set comprises a spacer disk which can be connected to the ring nut and a supporting disk which can be connected to the grooved shaft. The extension set can comprise several sets of spacer disks and supporting disks. By means of this extension set, the external diameter of the clamping device can, depending on the external diameter of the spacer disk and the supporting disk, in particular be enlarged such that winding cores with larger internal diameters (corresponding to the adjusted external diameter of spacer disk and supporting disk) can be clamped with the clamping device.

It can be provided that the spacer disk has three radial guide grooves, arranged offset by 120°, for receiving push-pull devices which, when the clamping device is in the clamping position, are brought to bear against the inner wall of the winding core by the clamping levers, forming a clamping force.

On their outer circumference the push-pull devices can have a receiving groove, in which an O-ring is arranged which grips around the push-pull device.

BRIEF DESCRIPTION OF THE DRAWINGS

The invention is now explained in more detail with reference to embodiment examples. There are shown in FIG. 1 a front view of the clamping device according to the invention.

DETAILED DESCRIPTION OF THE INVENTION

Figure 1:
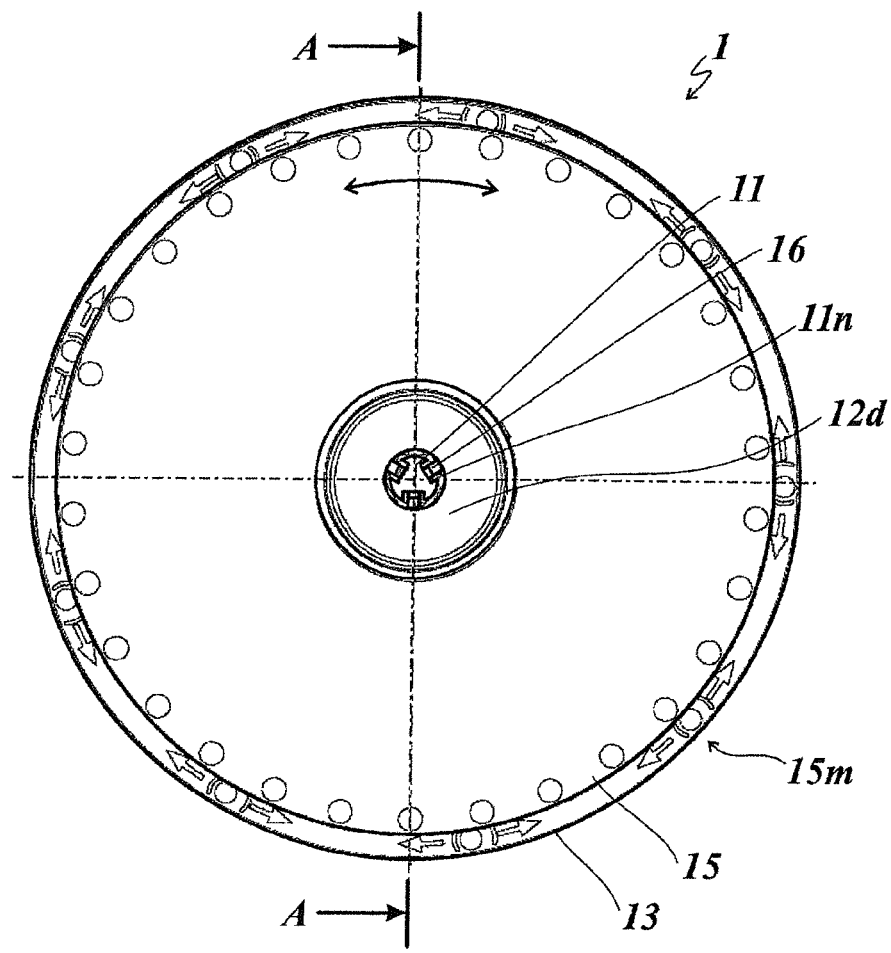
Figure 2:
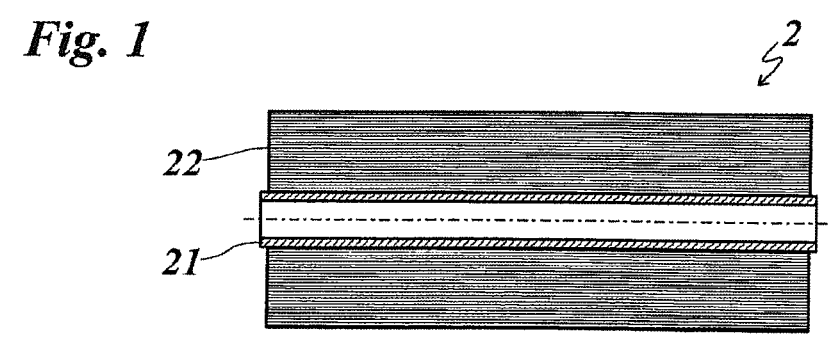
FIG. 2 a film roll which can be clamped on the clamping device in FIG. 1 in a schematic sectional representation.

FIGS. 1 and 3 show a clamping device 1 for receiving and clamping a film roll 2 which comprises a winding core 21 and a film reel 22 arranged on the winding core 21 (FIG. 2). The internal diameter of the winding core 21 can preferably be 1" or 3". The length of the winding core 21 can preferably lie in the range of from 10 mm to 1000 mm. The maximum diameter of the film reel 22 can preferably be 300 mm.

Figure 3A:
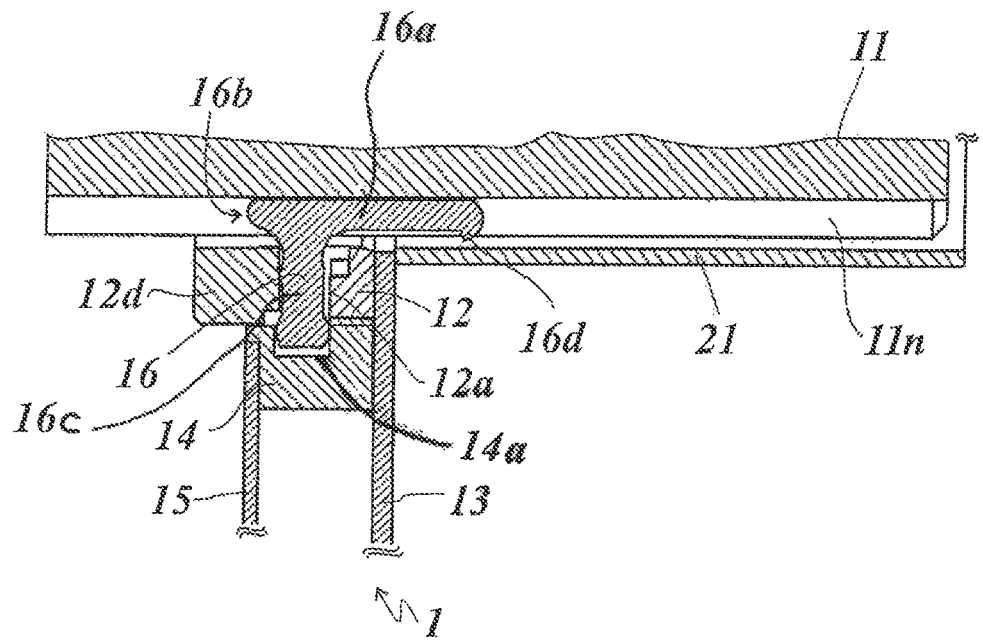
FIG. 3a a first embodiment example of the clamping device in FIG. 1 in open position in a partial sectional view along the section line A-A in FIG. 1.
Figure 3B:
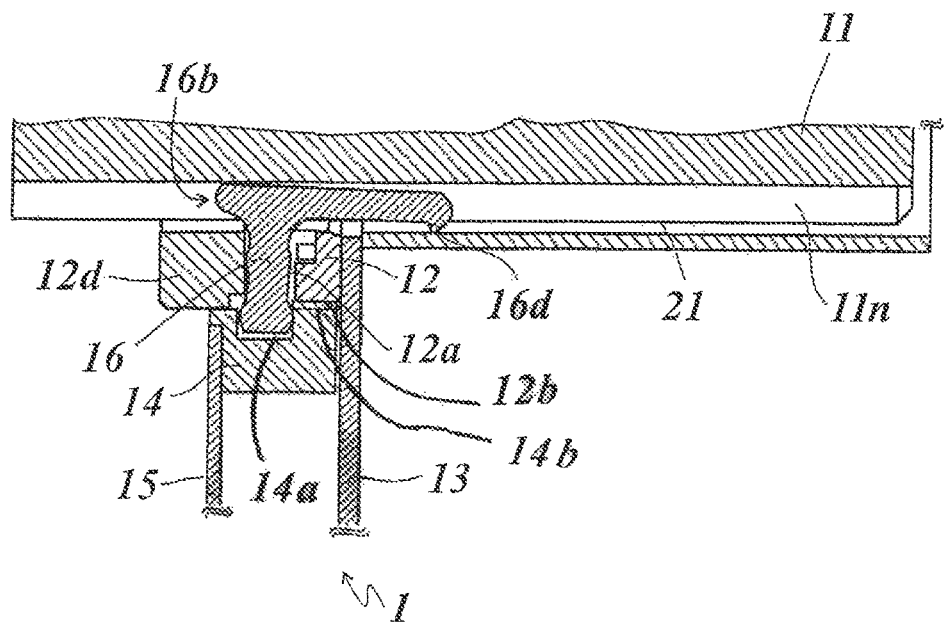
FIG. 3b the clamping device in FIG. 3a in clamping position.

The clamping device 1 comprises a grooved shaft 11, a ring nut 12, a rear locating disk 13, a lock nut 14, a front locating disk 15 and three clamping levers 16 (FIGS. 3a and 3b).

FIGS. 3a and 3b show, in a partial sectional view along the section line A-A in FIG. 1, a first embodiment example of the clamping device. Only the section of the clamping device 1 below the longitudinal axis of the grooved shaft 11 is shown, in which the details for the functioning of the clamping device can be seen.

The clamping device 1 shown in FIGS. 3a and 3b is provided to receive and clamp winding cores 21 with an internal diameter of 1".

Figure 4:
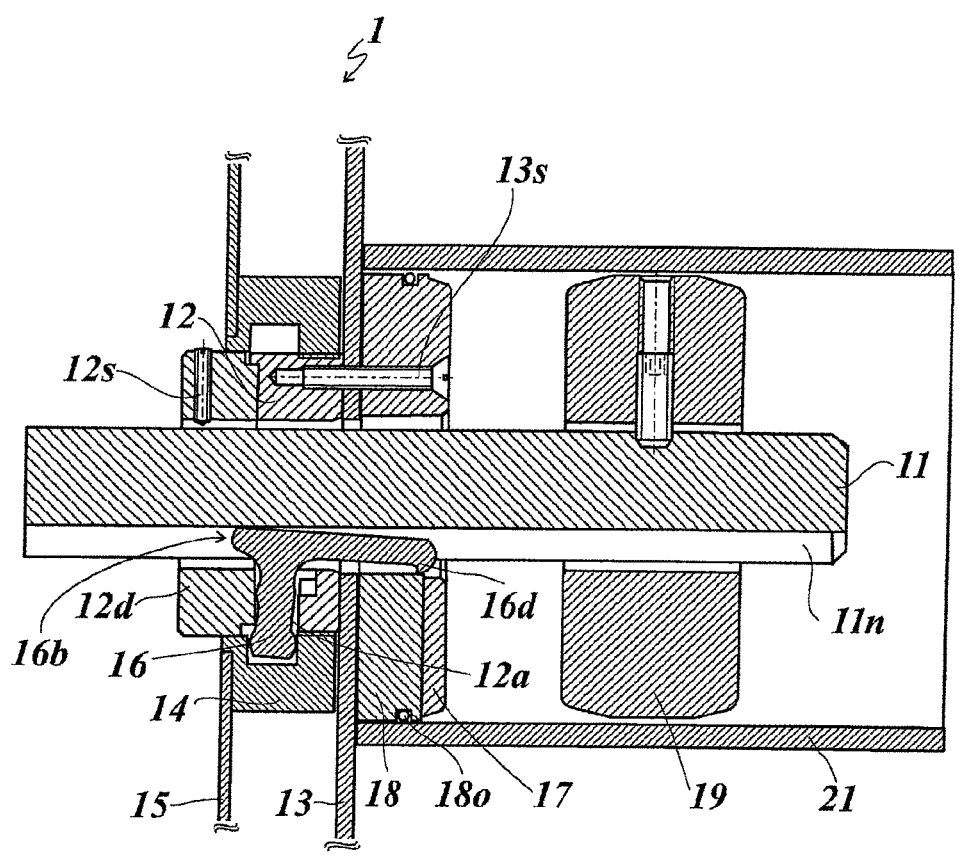
FIG. 4 a second embodiment example of the clamping device in FIG. 1 in a sectional view along the section line A-A in FIG. 1.

The ring nut 12 is connected to the rear locating disk 13 rotationally rigid, for example by means of one or more fastening screws 13s, as shown in FIG. 4. An external thread 12b of the ring nut 12 engages in an internal thread 14b of the lock nut 14, as shown in FIG. 3b. The lock nut 14 and the ring nut 12 form a self-locking screw gear which can be actuated manually by means of the locating disks 13, 15. The rear locating disk 13 is formed fixed to the frame. When the front locating disk 15 is rotated counterclockwise, the clamping levers 16 of the clamping device 1 pass into an open position, in which the film roll 2 can be inserted into the clamping device 1 or removed from the clamping device 1. The winding core 21 of the film roll 2 inserted into the clamping device 1 overlaps the grooved shaft 11 and bears with an end face against the rear locating disk 13.

When the front locating disk 15 is rotated clockwise, the clamping levers 16 of the clamping device 1 pass into a clamping position, in which the film roll 2 is connected to the clamping device 1 rotationally rigid. On its outer edge section the front locating disk 15 has markings 15m which illustrate the operating procedure (FIG. 1). With the aid of these markings 15m and/or, for example, a different color of the locating disks 13, 15 a quick and low-error operation of the clamping device 1 can take place.

The ring nut 12 has three groove-shaped bearing recesses 12a, arranged radially and offset by 120°, for receiving the clamping levers 16. The ring nut 12 is covered on the front by a cover ring 12d. The ring nut 12 and the cover ring 12d can be formed in one piece.

The lock nut 14 is connected to the front locating disk 15 rotationally rigid. The lock nut 14 has, on its outer circumference, three groove-shaped positioning recesses 14a, offset by 120°, in which the clamping levers 16 engage, as described further below.

The grooved shaft 11 has three grooves 11n, arranged in the longitudinal direction and offset by 120°, in which the clamping levers 16 engage. The grooved shaft 11 can, for example, be formed as a round shaft or a hexagonal shaft. The formation as a hexagonal shaft has the advantage that the grooved shaft 11 can be fixed by means of a wrench. For a longest diagonal of 1", for example, a wrench size of 22 is to be chosen.

The clamping levers 16 are formed as T-shaped angle levers with a first and a second lever arm 16a, 16c, wherein the second lever arm 16c protrudes from the first lever arm 16a in the direction of the lock nut 14 and divides the first lever arm into a longer and a shorter segment. The end section of the longer segment is formed as a projecting pressure piece 16d which, when the clamping device 1 is in the clamping position, bears on the inner wall of the winding core 21. The shorter segment has a curved end section 16b which, when the clamping device 1 is in the clamping position, bears on the base of the groove 11n of the grooved shaft 11.

The second lever arm of the clamping lever 16 is formed as a bearing and positioning arm which, with its curved middle section, is mounted pivotably in the bearing recess 12a of the ring nut 12. The bearing recess 12a is covered by the cover ring 12d. The end section of the second lever arm of the clamping lever 16 engages in the positioning recess 14a of the lock nut 14.

When the clamping device 1 is in the open position, the first lever arm of the clamping lever 16 bears with its longitudinal side on the base of the groove 11n (see FIG. 3a). When the front locating disk 15 is rotated counterclockwise, the lock nut 14 is moved away from the rear locating disk 13 and pivots the clamping levers 16 synchronously, with the result that the clamping levers 16 pass into the clamping position described above, in which the first lever arm is supported with the pressure piece 16d on the inner wall of the winding core 21 and with the curved end section 16b on the base of the groove 11n of the grooved shaft 11, forming a clamping force. Because of the arrangement of the three clamping levers 16 offset by 120°, at the same time the winding core 21 is thereby centered with respect to the grooved shaft 11, with the result that the longitudinal axes of the winding core 21 and of the grooved shaft 11 are aligned (see FIG. 3*b*).

Figure 5A:
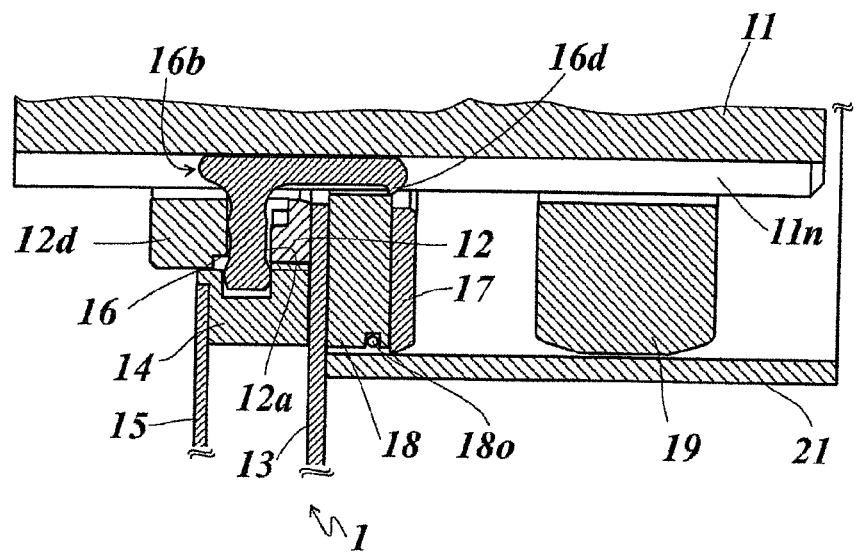
FIG. 5a the clamping device in FIG. 4 in open position in a partial sectional view.
Figure 5B:
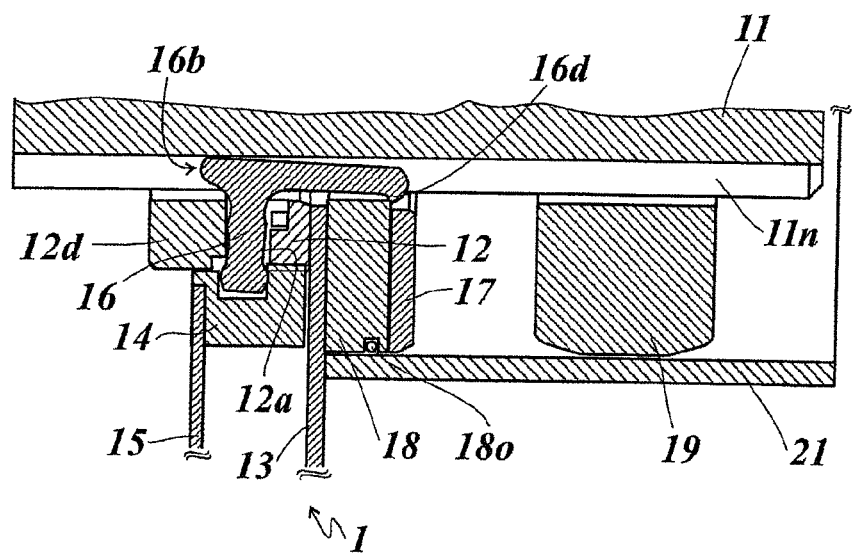
FIG. 5b the clamping device FIG. 5a in clamping position.

FIGS. 4, 5*a* and 5*b* show a second embodiment example of the clamping device which is provided for receiving and clamping winding cores 21 with an internal diameter of 3".

In FIGS. 4, 5*a* and 5*b*, a clamping device 1 is formed like the clamping device described further above in FIGS. 3*a* and 3*b*, with the difference that the clamping device 1 further comprises a spacer disk 17, three push-pull devices 18, an O-ring 18*o* and a supporting disk 19, as shown in FIG. 4.

The spacer disk 17 is connected to the ring nut 12 rotationally rigid and has three guide recesses, arranged radially and offset by 120°, for receiving the push-pull devices 18. The push-pull devices 18 are arranged such that they interact with the clamping levers 16 and transfer the clamping forces from the clamping levers 16 to the inner wall of the winding core 21. The push-pull devices 18 have, on their outer wall, a receiving groove for receiving the O-ring 18*o* which grips around the push-pull devices 18 and, in the open position, pushes down in the direction of the grooved shaft 11. The O-ring 18*o* preferably consists of a rubber-elastic material which, on the one hand, pushes the push-pull devices 18 down into the open position and, on the other hand, in the clamping position, increases the friction coefficient between the push-pull device 18 and the inner wall of the winding core 21.

As tests have shown, in both embodiment variants a clamping force of approx. 1 kN can be set. The necessary clamping force is, i.a., dependent on the friction coefficient of the material of the winding core 21. Cardboard or plastic are preferably used as material for the winding core 21. As material for the clamping device 1, in particular for the clamping levers 16 and the push-pull devices 18, steel is preferred. A plastic of suitable strength can also be provided as material.

Both in the embodiment shown in FIG. 4 and in the embodiment described further above in FIGS. 3*a* and 3*b*, the cover ring 12*d* has a radial threaded hole in which a retaining screw 12*s* formed as a stud screw engages. This retaining screw arrests the clamping device 1 on the grooved shaft 11 when the clamp is open. This makes handling easier since the positioning of the clamping device does not have to be adjusted every time the clamp is opened to change the film roll 2 because it has slipped on the grooved shaft 11. The retaining screw 12*s* is optional because the clamp also functions without the retaining screw. However, without the retaining screw 12*s*, every time the film roll 2 is changed, the clamping device would "lose" the desired horizontal position on the grooved shaft 11, which is necessary for drawing in the respective film roll 2.

LIST OF REFERENCE NUMBERS

1 Clamping device
2 Film roll
11 Grooved shaft
11*n* Groove
12 Ring nut
12*a* Bearing recess
12*d* Cover ring
12*s* Retaining screw
13 Rear locating disk
13*s* Fastening screw
14 Lock nut
15 Front locating disk
15*m* Marking
16 Clamping lever
16*b* Curved end section
16*d* Pressure piece
17 Spacer disk
18 Push-pull device
18*o* O-ring
19 Supporting disk
21 Winding core
22 Film reel

The invention claimed is:

1. A clamping device for receiving and clamping a film roll, comprising a winding core and a film reel arranged on the winding core, wherein the clamping device can be moved from an open position, in which the film roll can be inserted into the clamping device or removed from the clamping device, into a clamping position, in which the film roll is clamped in the clamping device,
    wherein the clamping device comprises a grooved shaft with receiving grooves arranged in the longitudinal direction offset at the same angular distance, a screw gear formed from a ring nut and a lock nut, and clamping levers arranged radially offset at the same angular distance,
    wherein an output member of the screw gear interacts with the clamping levers such that, when the clamping device is in the clamping position, the clamping levers bear on the base of the grooves of the grooved shaft and on the inner wall of the winding core, forming a clamping force, and
    wherein the grooved shaft has three receiving grooves arranged in the longitudinal direction offset by 120°, in which three clamping levers which are arranged radially offset by 120° engage, and
    wherein the ring nut has three groove-shaped bearing recesses arranged radially offset by 120°, which form pivot bearings for the clamping levers, and
    wherein the lock nut has an outer circumference with three groove-shaped positioning recesses offset by 120°, in which the clamping levers engage.

2. The clamping device according to claim 1, wherein the lock nut is the output member of the screw gear.

3. The clamping device according to claim 1, wherein the clamping levers are formed as T-shaped angle levers with a first and a second lever arm, wherein the second lever arm protrudes from the first lever arm and divides the first lever arm into a longer and a shorter segment.

4. The clamping device according to claim 3, wherein the longer segment of the first lever arm of the clamping lever has an end section formed as a projecting pressure piece which, when the clamping device is in the clamping position, bears on the inner wall of the winding core, and
    wherein the shorter segment of the first lever arm of the clamping lever has a curved end section which, when the clamping device is in the clamping position, bears on the base of the groove of the grooved shaft, and
    wherein a curved-projecting middle section of the second lever arm of the clamping lever engages in the groove-shaped bearing recess of the ring nut, and
    wherein the end section of the second lever arm of the clamping lever engages in the positioning recess of the lock nut.

5. The clamping device according to claim 1, wherein the threads of the ring nut and of the lock nut are formed as self-locking threads.

6. The clamping device according to claim 1, wherein the clamping device has a front locating disk and a rear locating disk facing the film roll, wherein the front locating disk is connected to the lock nut rotationally rigid and the rear locating disk is connected to the ring nut rotationally rigid.

7. The clamping device according to claim 6, wherein the front locating disk has a smaller diameter than the rear locating disk.

8. The clamping device according to claim 6, wherein the front locating disk has markings which indicate the direction of rotation of the front locating disk to set the clamping position and the open position of the clamping device.

9. The clamping device according to claim 1, wherein an extension set for extending the receiving diameter of the winding cores can be inserted into the clamping device.

10. The clamping device according to claim 9, wherein the extension set comprises a spacer disk which can be connected to the ring nut and a supporting disk which can be connected to the grooved shaft.

11. The clamping device according to claim 10, wherein the spacer disk has three radial guide grooves, arranged offset by 120°, for receiving push-pull devices which, when the clamping device is in the clamping position, are brought to bear against the inner wall of the winding core by the clamping levers, forming a clamping force.

12. The clamping device according to claim 11, wherein each of the push-pull devices has an outer circumference with a receiving groove, in which an O-ring is arranged which grips around the push-pull devices.

\* \* \* \* \*